(12) United States Patent
Vakili

(10) Patent No.: US 11,131,598 B2
(45) Date of Patent: Sep. 28, 2021

(54) TECHNOLOGY TO CONTROL A MODEL AND BALANCE SUPPORT SYSTEM'S DYNAMICS AND ISOLATE THE BALANCE AS NEEDED TO INCREASE TEST FACILITIES PRODUCTIVITY

(71) Applicant: Ahmad D. Vakili, Tullahoma, TN (US)

(72) Inventor: Ahmad D. Vakili, Tullahoma, TN (US)

( * ) Notice: Subject to any disclaimer, the term of this patent is extended or adjusted under 35 U.S.C. 154(b) by 222 days.

(21) Appl. No.: 15/669,098

(22) Filed: Aug. 4, 2017

(65) Prior Publication Data

US 2018/0067015 A1 Mar. 8, 2018

Related U.S. Application Data

(60) Provisional application No. 62/494,318, filed on Aug. 4, 2016.

(51) Int. Cl.
*G01M 9/06* (2006.01)
*G01M 9/04* (2006.01)
*B64F 5/60* (2017.01)
*G01M 9/08* (2006.01)

(52) U.S. Cl.
CPC .............. *G01M 9/062* (2013.01); *G01M 9/04* (2013.01); *B64F 5/60* (2017.01); *G01M 9/08* (2013.01)

(58) Field of Classification Search
CPC ................................ G01M 9/06; G01M 9/062
See application file for complete search history.

(56) References Cited

U.S. PATENT DOCUMENTS

| | | | | |
|---|---|---|---|---|
| 3,540,273 A * | 11/1970 | Martin | ................... | G01L 5/161 73/147 |
| 5,644,075 A * | 7/1997 | Hefer | ..................... | G01M 9/04 310/328 |
| 9,134,195 B1 * | 9/2015 | Adamson | ............... | G01M 9/08 |

* cited by examiner

*Primary Examiner* — Walter L Lindsay, Jr.
*Assistant Examiner* — Andrew V Do
(74) *Attorney, Agent, or Firm* — Hornkohl Intellectual Property Law, PLLC; Jason L. Hornkohl

(57) ABSTRACT

A balance protection system for a wind tunnel test system that includes a balance component, a model component connected to the balance component and a sting component connected to the balance component is disclosed. The balance protection system includes a first set of features on the model component that mate with a second of features on to the sting component. The clearances between the first and second set of features determine an amount of allowed movement of the model with respect to the balance. Actuators can be used to actively adjust the amount of clearance and respective allowed movement of the model with respect to the balance. Limiting movement of the model with respect to the balance protects the balance from damage caused by excessive forces applied to the model.

21 Claims, 15 Drawing Sheets

TECHNOLOGY TO CONTROL A MODEL AND BALANCE SUPPORT SYSTEM'S DYNAMICS AND ISOLATE THE BALANCE AS NEEDED TO INCREASE TEST FACILITIES PRODUCTIVITY

CROSS-REFERENCES TO RELATED APPLICATIONS

The present application claims priority from U.S. Provisional Patent Application No. 62/494,318 filed Aug. 4, 2016 entitled "Technology for mitigating adverse model and balance support system dynamics and damage protection in wind tunnels" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Force and moment balances are used to perform quantitative measurements. Such balances are precision components that are delicate and must be used within their elastic design ranges for them not to be damaged. High quality balances are quite expensive, therefore, damaging a balance can be an expensive experience, especially since keeping a spare balance is quite rare. To make a new balance, may take a few months or longer. Such a delay in the development of a system may incur costs of millions of dollars in certain cases. As a result, tests are performed deliberately to minimize the potential for damaging a balance. Most aerospace, and many other systems development, testing and evaluation efforts involve configuration testing in simulated flows such as wind tunnels, prototype flight testing or simulated environments. Typically advanced testing of models or prototypes involves internal balances for force and moment measurements which experience certain dynamics during the taking of measurements. Such models are installed onto a balance supported by a sting. The sting is supported by appropriate structures that allow various adjustments to the subjects for desired alignment, angles of attack and roll during the tests without interfering with the forces and moments measurements. Ideally, the operational boundaries of the balance components are in their elastic regions or linear range of the balance components. When fluid effects forces and moments data are collected, under certain conditions, a model may experience oscillatory loads which occasionally grow to unexpectedly large loads which may be outside of the elastic or linear operational limits of the balance. This will damage the balance and irreversibly impact the accuracy of the data collected with the affected balance thereafter. Such conditions arise, often, due to the presence of larger than designed static or oscillatory loads or motions or sudden transient fluid dynamic effects and events which result in significant balance overload and lead to expensive damage or loss of components and resources. Such events have been experienced when testing advanced configurations by numerous communities. This includes rolling moment snaps from abrupt wing stall. A number of techniques have been developed for model-balance-sting vibration control, using active piezoelectric actuators at key locations on the stings. Sting vibration control techniques are generally partially effective in providing some amplitude attenuation which permits increasing the operational limits and lowers vibration thereby improving the data measurements. It is possible that the abrupt wing stall or certain other types of large amplitude dynamics of concern, are not originating solely by the assembly's vibration transitioning into an uncontrolled limit cycle. Prior development of a practical and effective solution has been limited. Application of sting dynamics control has been partially successful in mitigating these types of dynamics. However, this approach has had limited success in protecting a balance when significant loads were suddenly experienced such as abrupt wing stall types of vibration and loads, which is a major focus of the current technology innovation disclosed in the present patent application.

Therefore, what is needed is a new and novel technology to control a model and balance support system's dynamics and isolate the balance as needed to increase test facilities' productivity.

BRIEF SUMMARY OF THE INVENTION

The present invention uses a number of interface devices positioned between the sting and the model installation blocks to limit the extent of their relative motion in order to protect the model balance in a wind tunnel test setup. The present invention functions to arrest any displacement experienced by a balance only when the displacement is beyond the elastic range of the balance's components. This innovation is founded on a class of precision interrelated design concepts, composed of the passive, adaptive, and active methodologies further discussed below. Precision balance protection system designs preferably use adaptive/active techniques to limit the maximum relative displacements, including the rotational displacements between the model and balance and the model and sting.

A number of different versions of this innovative balance protection system were developed, designed and manufactured. A large and customized balance protection system was designed based on this innovation and was fabricated for use in a given real model and balance system test. The design used an innovative methodology to protect a typical (but specific) wind tunnel balance from potential transient and sudden overloads. The goal is to reduce, limit and or eliminate (typically small vibrations can be averaged out) various components of rotations and displacement or vibration amplitudes which may be experienced by a balance to improve measurement accuracy and to eliminate the potential for damage to the balance and possibly the model and wind tunnel facility.

With the above goals in mind, an embodiment of the present invention is directed toward a balance protection system for a wind tunnel test system that includes a model, a balance attached to the model and a sting attached to the balance. The balance protection system includes a model component connected to the model and a sting component connected to the sting. A precision designed interface coupler limits movement of the model component with respect to the sting component to a predetermined amount of movement. The coupler preferably includes a rotation limiter that includes a first set of features attached to or on the model component that mate with a second set of features attached to or on the sting component. The first set of features preferably includes a first set of mechanical teeth and the second set of features includes a second set of mechanical teeth that interact with the first set of mechanical teeth to limit movement of the model component with respect to the balance to the predetermined amount of movement. Alternatively, the first and the second set of features includes at least one convex shaped projection that interacts with at least one concave shaped projection to limit the movement of the model with respect to the balance to the predetermined amount of movement. The first and the second set of features are preferably removable and replaceable to allow for easy adjustments and changes to the system.

Clearances between the first set of features on the model component and the second set of features on the sting component are used to determine the predetermined amount of allowed movement along up to three different axis of rotation. If desired, actuators such as piezo electric transducers, electromechanical actuators, or electrorheological actuators can be attached to the features that allow the amount of clearance between the features to be actively adjusted by a computer. The actuator also preferably allows a user to selectively arrest relative motion between the model and sting components. In addition, a mating interface surface of the features can be coated with a damping material such as neoprene rubber that dampens interactions between the first and second sets of features. A data acquisition system computer monitors contact between the first and second features with a continuity circuit and loads placed on the components with load sensors.

Another embodiment of the present invention is directed toward a method of implementing a balance protection system for a test system that includes a model, a balance coupled to the model and a sting coupled to the balance. The method begins with the step of determining a set of maximum allowable limits for movement of the model with respect to the sting. A model block is created that can be coupled to the model and a sting block is created that can be coupled to the sting. Mating features are then created on the model block that are designed to interact with corresponding mating features created on the sting block. Clearances corresponding to the maximum allowable movement limits are then created between the mating features of the model block and the mating features of the sting block. The clearances are preferably actively adjusted through the use of actuators such that the allowed range of motion can be actively adjusted.

DETAILED DESCRIPTION OF THE INVENTION

An innovative Balance Protection System (BPS) for fluid dynamics measurement balances has been designed, developed and tested by the present inventor. The design utilizes an innovative methodology to protect a wind tunnel balance from potential transient and sudden overloads which may damage the balance. The design reduces, limits and or eliminates various components of rotations and displacement or vibration amplitudes which may be experienced by a balance to improve measurement accuracy and to eliminate the potential for damage to the balance and possibly the model and wind tunnel. Operation of this innovative technology has been demonstrated using numerical modeling and benchtop static testing. Computation of simulated loads involved max load design validation and demonstration of static and dynamic loading simulations on a setup similar to realistic test conditions for the system's operation in a wind tunnel. Design details and implementation of these BPS innovation mechanisms and their operation may readily be scaled and expanded, as discussed herein, to various model and balance sizes, load range of force and moment balances. A numerical simulation demonstrated the use of the innovation for effective overload protection, including variable limits, and damping or locking out of the model to the sting system for safely eliminating the balance for exploratory testing and protection from unexpected system oscillations. Such functionality can be readily implemented for each specific type of model, balance and sting support system in a wind tunnel. Implementation of this innovation and the system's integration into a test setup leads to improved safety for the test article, measuring components and equipment. Furthermore, this innovation when in place, can significantly increase the overall facilities and systems productivity.

Figure 1:
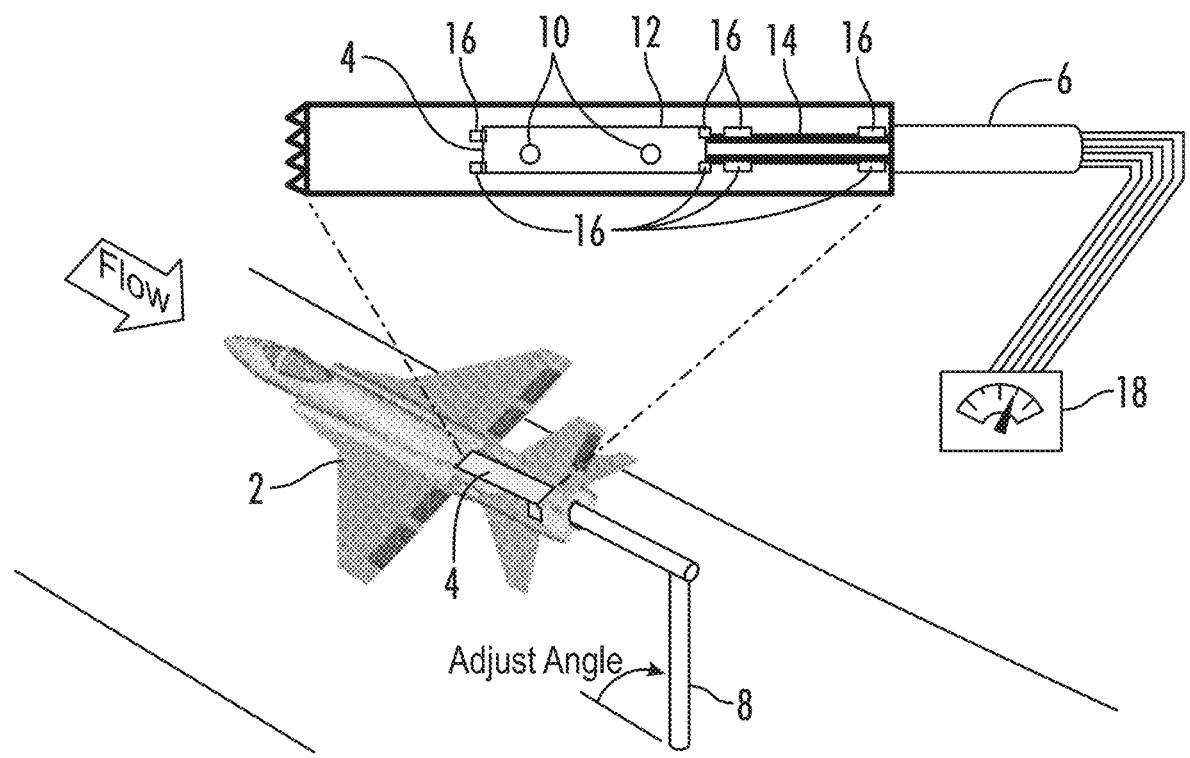
FIG. 1 is an illustration of a prior art example of a wind tunnel model installation.

Referring now to FIG. 1, an illustration of a prior art example of a wind tunnel model installation is shown. The wind tunnel model 2 is connected by an internal balance 4 to a sting 6 attached to a sting mount 8. The internal balance 4 has model attachment points 10 that attach the model 2 to axial 12 and normal and bending components 14. Strain gages 16 are positioned in the internal balance 4 to measure forces placed on the axial 12 and normal and bending components 14. A computer 18 records the data received from the strain gages 16 for analysis.

An innovatively unique and detailed engineered device has been developed by the present inventor to prevent damage to a balance 4 such as shown in FIG. 1. This BPS is designed to protect force and moment balances from damage during testing due to unexpected model forces and moment behaviors or any other out of elastic range loading. The BPS technology innovation is composed of a number of interface devices and alignment fixtures which fit between the model and support sting and the model installation block. The innovative design mechanism can be readily customized for different model and sting configurations. When such a BPS is manufactured and installed, with appropriate precision and implemented properly, it functions to dampen and arrest large deviations caused by amplified vibratory motion and abrupt wing snap experienced by a balance only when these are beyond the elastic range of each relevant balance component. The innovation may be extended and applied to a class of related designs effectively delivering the same outcome in different manners. The invention can incorporate passive, adaptive, and active methodologies for controlling the allowable forces. Precision designs use adaptive/active techniques to limit the maximum displacements, including rotational displacement between the model and balance.

A number of different versions of this innovative balance BPS have been developed, designed and manufactured. The design goal is to reduce, limit and or eliminate various components of rotations and displacement or vibration amplitudes which may be experienced by a balance to improve measurement accuracy and to eliminate potential for damage to the balance and possibly model and tunnel.

The BPS system is precision designed to fit in the limited space available between the model support system components and provide precision displacement clearances calculated for secure stop limits. Each BPS system is designed to fit the clearances available and would be uniquely fit for each model and sting support system, within the framework of the design innovation. Numerical simulation of the various configurations were performed and results indicated full functionality, in line with the technology innovation designed for mitigating the various problematic issues.

Such a device can, in desired cases, effectively limit the range of motion with solid stops coated with selected damping materials to reduce shocks to the system. The limiters constrain the rotation and displacement of a balance within the balance's safe elastic range, even when acted on by excessive static or dynamic loads. One design rendition of the innovation will fully lock the relative motion between the model and the sting. The integrated locking system can be based on electromechanical, piezoelectric, and electrorheological principles or using other appropriate technologies. Occasionally, test engineers desire to sweep the operational range of a model without the fear of damaging a balance. To safely do so, a wind tunnel facility is operated with the model installed without the balance in the loop. This mode would allow test engineers to evaluate the model's behavior while operating near its extreme test envelop, safely.

Bypassing the balance, or actively limiting the various relative motions between the two devices is readily achievable using the present invention. The customized device or mechanism is located at or near the interface of the model and sting, as determined by the available clearances, and its interface, relative physical location and shape and geometry are adaptively and actively dynamically adjustable as the needs and complexities allow.

Figure 2:
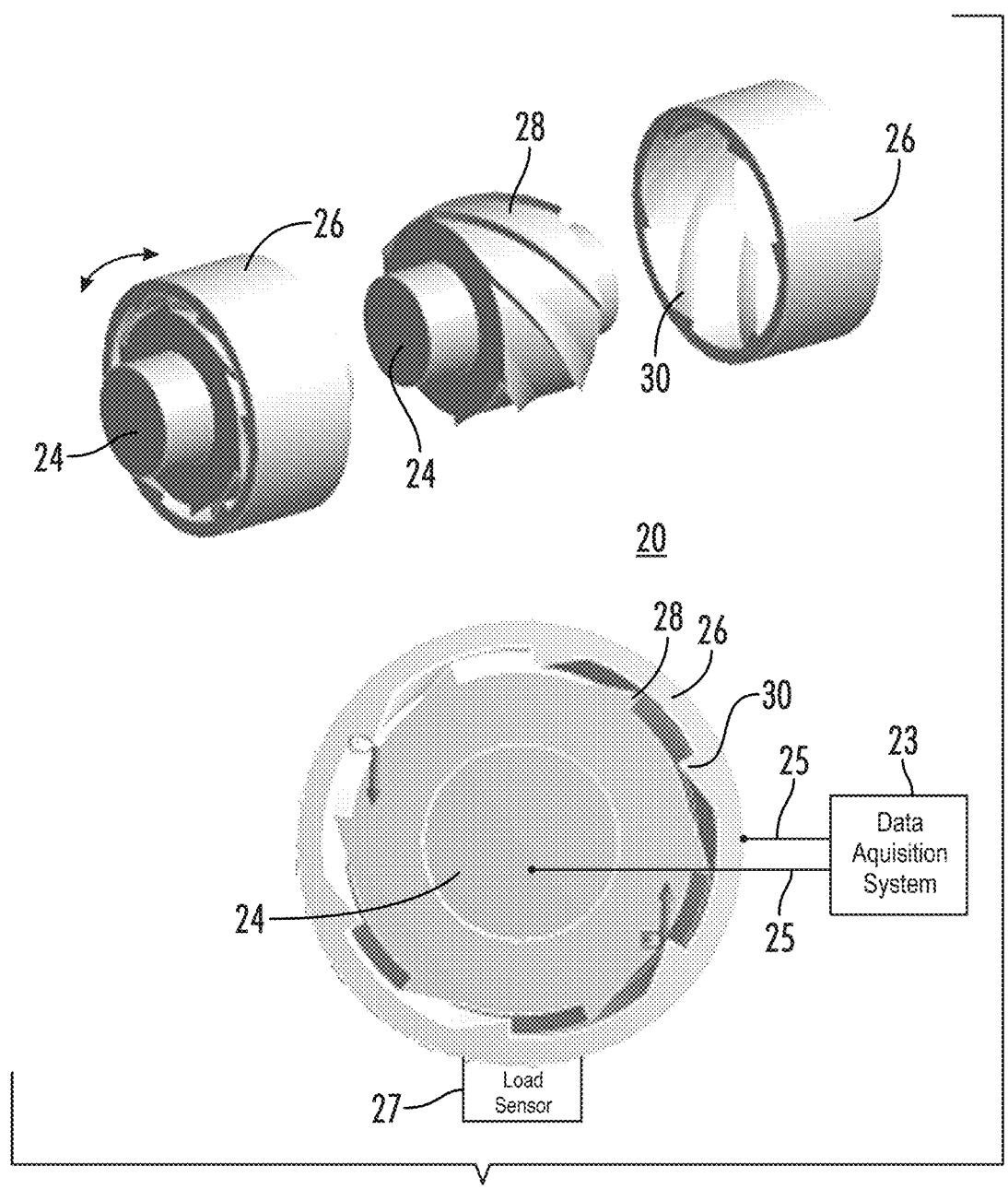
FIG. 2 is an illustration of a passive, variable offset rotation limiter constructed in accordance with an embodiment of the present invention.

Referring now to FIG. 2, an illustration of a passive variable offset rotation limiter 20 constructed in accordance with an embodiment of the present invention shown. The passive variable offset rotation limiter 20 includes a model mount 24 connected to the model and a sting mount 26 connected to the model's balance sting. A series of ridges 28 on the model mount 24 interact with a corresponding set of ridges 30 on the sting mount 26 to limit rotation of the model with respect to the sting. If the model mount 24 is rotated with respect to the sting mount 26 beyond a desired amount, the ridges 28 of the model mount 24 engage the ridges 30 of the sting mount 26 until the edges of the respective ridges are forced together such that further rotation of the model mount 4 with respect to the sting mount 26 in a certain direction is prevented. The limit to the rotation is determined by the length, size and configuration of the ridges 28 and 30 on the model 24 and sting 26 mounts which can be selected to limit the rotation to a specific desired amount. In addition, the rotational limit can be varied by simply adjusting the initial position of the model mount 24 with respect to the sting mount 26. The position of the ridges 28 and 30 on either the model mount 24 or the sting mount 26 is interchangeable and the features of the model mount 24 maybe placed on the sting mount 26 or vice versa.

Application software running on the data acquisition system 23 monitoring the test is preferably used to monitor and control the balance protection system. An electrical signal is used to provide a time marker for the moment contact is made between the model mount 24 and the sting mount 26 components. Such an electrical signal can be readily generated via a continuity circuit 25 connected the sting 26 and model 24 components. The continuity circuit 25 is closed when the two interfaces are in contact, and the circuit is open when the surfaces are not in contact. If additional data is desired, a load sensor 27 can be installed onto one or both of the BPS mating model 24 and sting 26 components. Presence of any contact/interactions between the two sides causes the load sensor 27 to generate a load signal indicative of the interactions. Preferably, the load sensor 27 is installed on the sting mounted 26 element to facilitate minimal wiring requirements from the model to the data acquisition computer 23.

The timing signal can be used to provide both BPS initiated or terminated engagement timing to the data acquisition system and operator and be recorded with the data time traces for the model's testing. The signal alerts operators and data analysts that the forces and moments data collected during periods when the BPS is actively engaged needs adjusted to account for the effects of the BPS to ensure accuracy.

Figure 3:
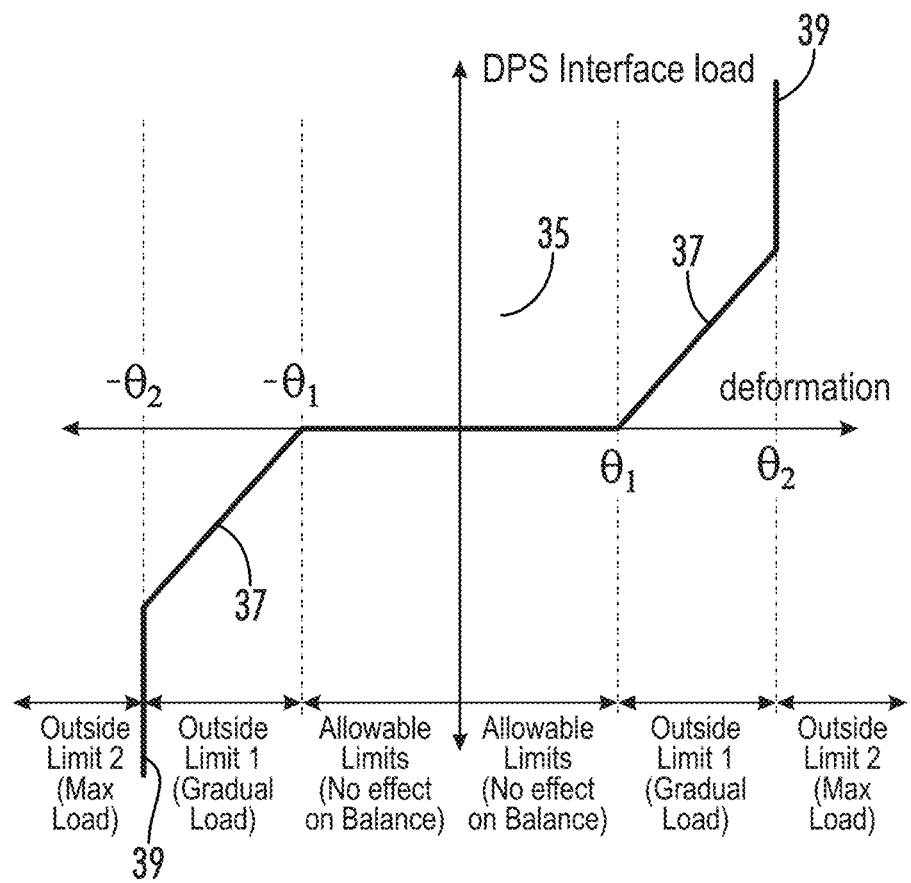
FIG. 3 is a graphic illustration of the effect of the rotation limiter of FIG. 2.

Referring now to FIG. 3, a graphic illustration of the effect of the rotational limiter of FIG. 2 is shown. The rotational limiter defines three areas of operation, a first area 35 that represents unobstructed rotation between the sting and model within allowable design limits, a set of second areas 37 that represent rotation outside of the predetermined acceptable design limits in either direction wherein the rotational limiter absorbs an increasing amount of the loads applied to the balance and a third set of areas 39 wherein further rotation of the model with respect to the sting in one direction is entirely prevented. The rate at which the limiter absorbs the forces applied to the balance which connects the model to the sting can be selected to provide a soft or hard stop or landing.

Figure 4:
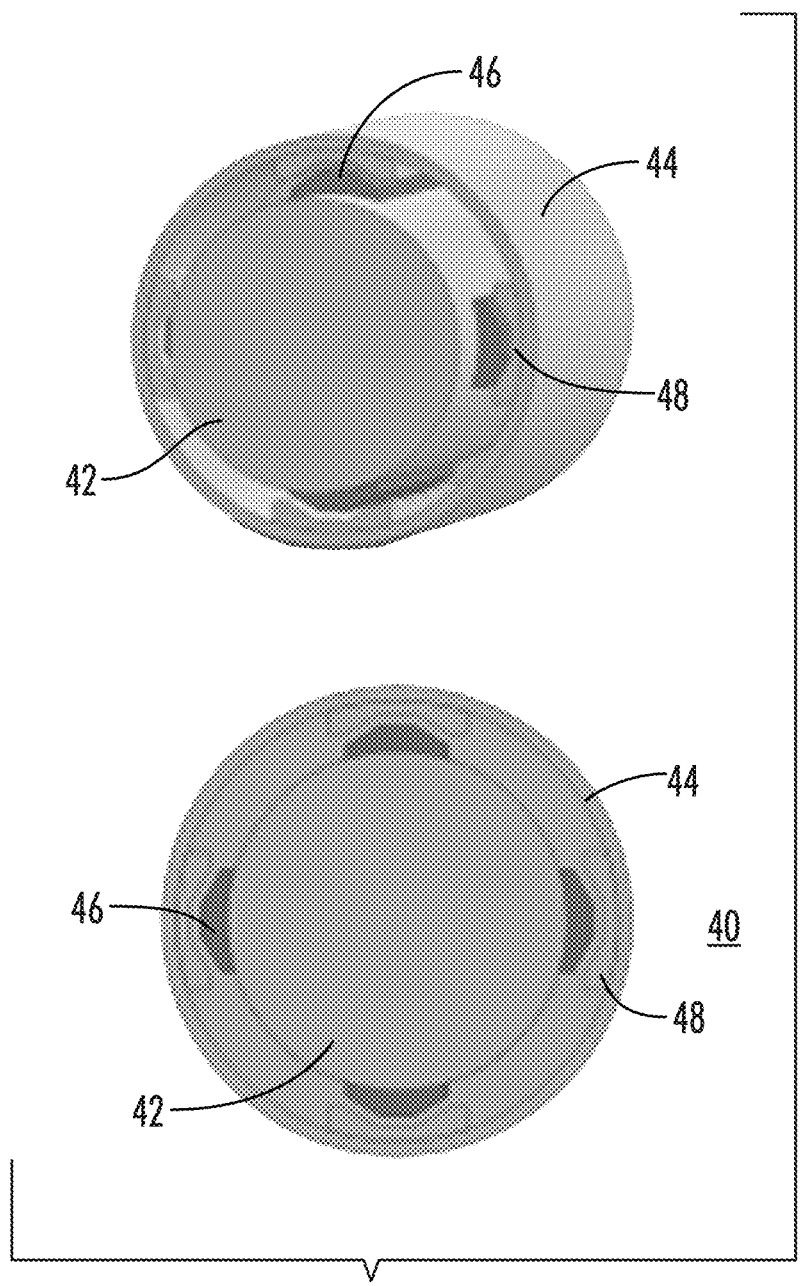
FIG. 4 is an illustration of a passive fixed offset rotation limiter constructed in accordance with another embodiment of the present invention.

Referring now to FIG. 4, an illustration of a passive fixed offset rotation limiter 40 constructed in accordance with another embodiment of the present invention is shown. The passive fixed offset rotation limiter 40 includes a model mount 42 connected to the model and a sting mount 44 connected to the model's sting. A series of trapezoidal convex bumps 46 on the model mount 42 interact with a corresponding set of concave bumps 48 on the sting mount 44 to limit rotation of the model mount 42 with respect to the sting mount 44. When the model mount 42 is rotated with respect to the sting mount 44 past a predetermined amount, the concave bumps 48 on the model mount 42 begin to engage the convex bumps 46 from the sting mount 44 thereby absorbing an increasing amount of the rotational forces applied to the model until further rotation of the model with respect to the sting is entirely prevented.

Figure 5A:
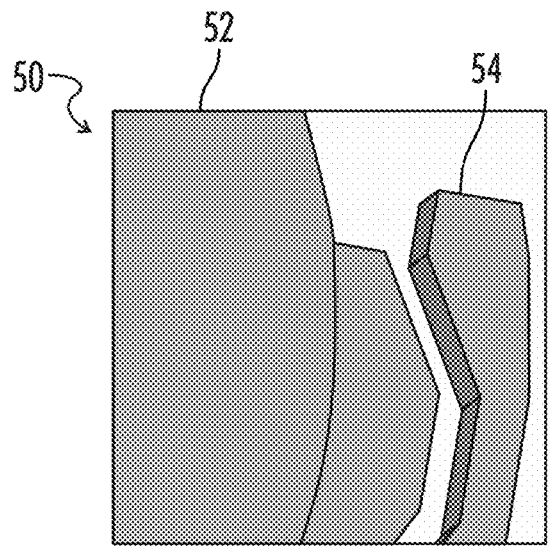
FIGS. 5(A) and 5(B) are illustrations of a rigid, FIG. 5(A), and flexible, FIG. 5(B), passive rotation limiter constructed in accordance with embodiments of the present invention.
Figure 5B:
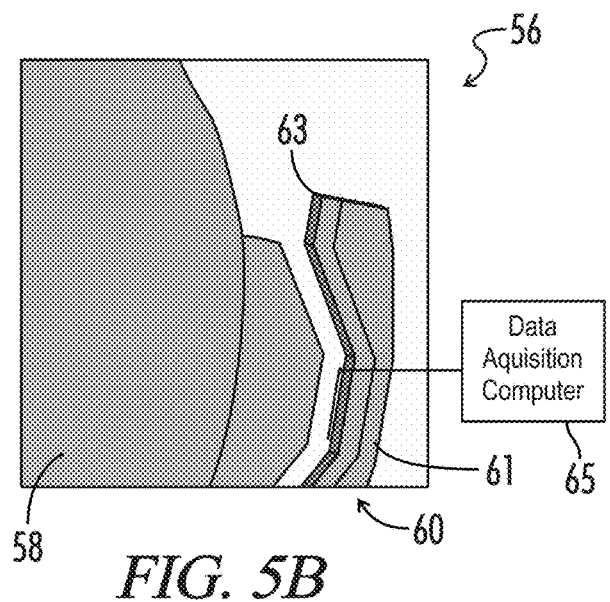

Referring now to FIGS. 5(A) and 5(B), illustrations of a rigid, FIG. 5(A), and flexible, FIG. 5(B), passive rotation limiter constructed in accordance with embodiments of the present invention are shown. The rigid passive rotation limiter 50 consists of a convex steel model mount 52 that interacts with a concave steel sting mount 54. The steel on steel interactions provide a precise and abrupt limit to the amount of allowed rotation. The flexible passive rotation limiter 56 consists of a convex steel model mount 58 that interacts with a neoprene rubber concave sting mount 60. The use of a flexible neoprene rubber dampens harsh impacts from jarring the model and balance and provides a more cushioned stop to the rotation. The model 58 or sting 60 mount may be constructed from neoprene rubber entirely or from another material that has been coated 63 with neoprene rubber to add damping to the BPS. The coating 63 may also include a piezoelectric crystal 61 shaped like a cantilever sheet or beam on top of the neoprene rubber layer. Applying an alternating voltage to the piezoelectric crystal 61 makes it vibrate. As the amplitude of the applied voltages is changed, then the damping properties and, thus, the damping effect of the piezoelectric crystal 61 and rubber layer 63 is changed. Such changes can be monitored and controlled by a data acquisition computer 65 as described herein. Electrorheological fluids can also be used to provide actively adjustable damping in a similar manner.

Figure 6:
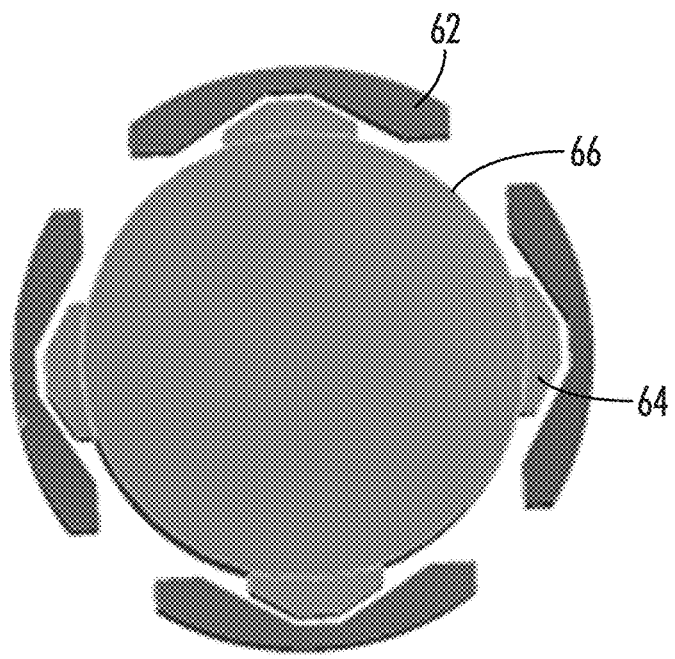
FIG. 6 is an illustration of a large rotation limiter constructed in accordance with an embodiment of the present invention.

Referring now to FIG. 6, an illustration of a large rotation limiter constructed in accordance with an embodiment of the present invention is shown. The degree of allowable rotation is increased by increasing the width of the concave projections 62 on the sting mount that interact with the concave projections 64 on the model mount 66 to prevent excessive rotation of the balance with respect to the model or the sting.

Figure 7:
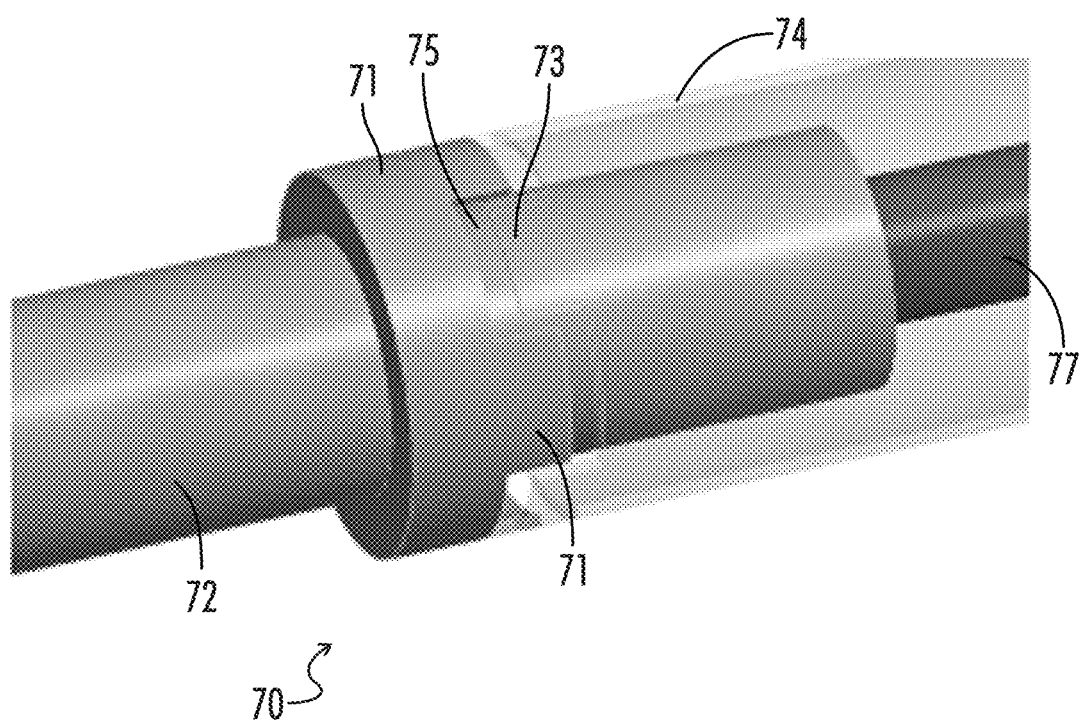
FIG. 7 is an illustration of a coupler connected between a sting or balance cage in accordance with an embodiment of the present invention.

Referring now to FIG. 7, an illustration of a coupler 70 positioned between a sting and balance cage constructed in accordance with an embodiment of the present invention is shown. The coupler 70 consists of series of mechanical teeth 71 on the sting 72 that interact with a second series of teeth 73 on the balance cage 74. Clearances 75 between the sides and tops of the interacting teeth 71 and 73 limit the amount of rotation between the sting 72 and balance 77. Increased or decreased amounts of allowed rotation in the form of pitch, yaw or roll can be set by simply varying the relevant clearances between the coupler's teeth 71 and 73.

Figure 8:
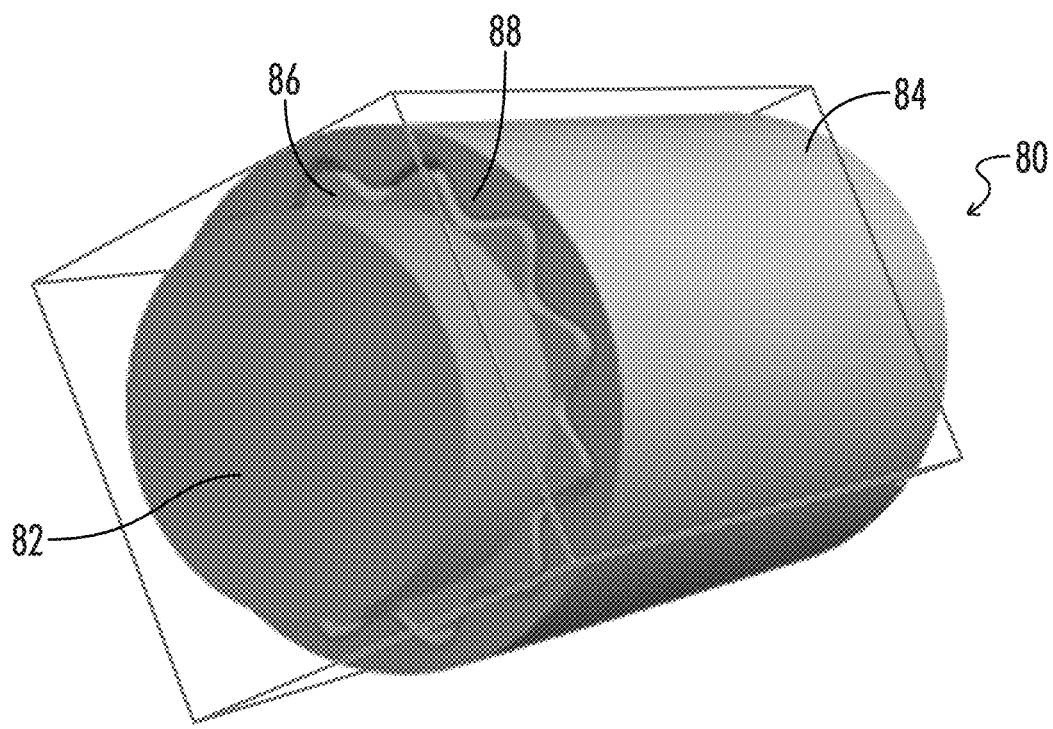
FIG. 8 is an illustration of a rotation limiting coupler with two rotational limits constructed in accordance with an embodiment of the present invention.

Referring now to FIG. 8, a fixed offset rotation limiting coupler 80 constructed in accordance with an embodiment of the present invention is shown. The coupler 80 consist of an inner mount 82 that fits in an outer mount 84. Clearances between the teeth 86 of the inner mount 82 and the teeth 88 of the outer mount 84 determine the fixed amount of allowed offset between the inner 82 and outer mounts 84. One of the inner mount 82 and the outer mount 84 is attached to the model block and the other is attached to the sting block to limit the amount of rotation of the model with respect to the balance and, thus, potential damage to the balance due to excessive rotational forces.

Figure 9:
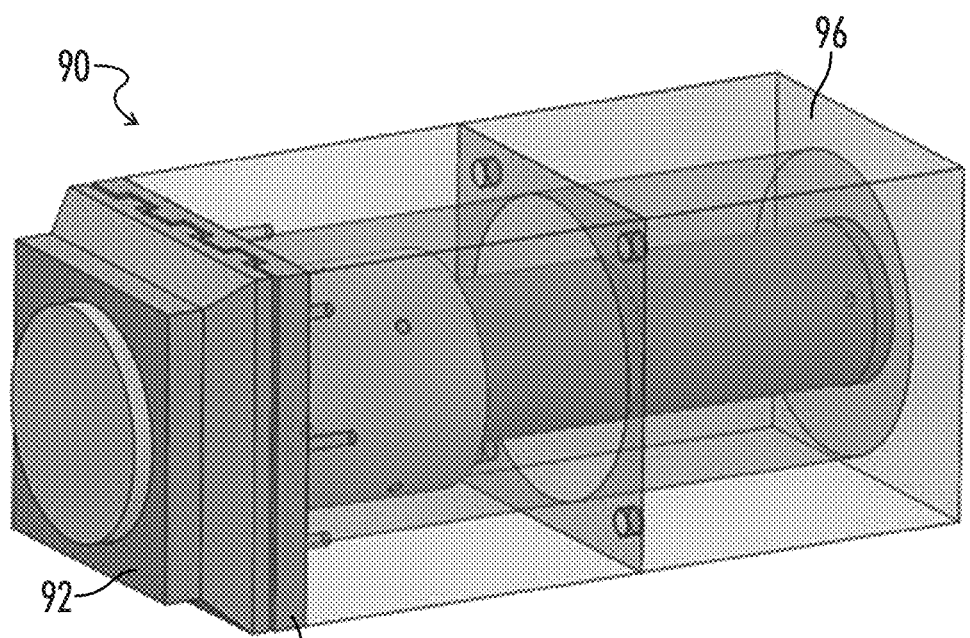
FIG. 9 is an illustration of a rotation limiting coupler with a three-axis limiter constructed in accordance with an embodiment of the present invention.

Referring now to FIG. 9, an illustration of a rotation limiting coupler 90 with a three-axis limiter constructed in accordance with another embodiment of the present invention is shown. The rotation limiting coupler 90 consists of a model block adapter 92 and a balance cage or sting adapter 94. As discussed in further detail below, features on the model block adapter 92 interact with features on the balance cage/sting block adapter 94 to prevent excessive rotation of the model block with respect to the balance cage 96 along three rotational axis.

Figure 10:
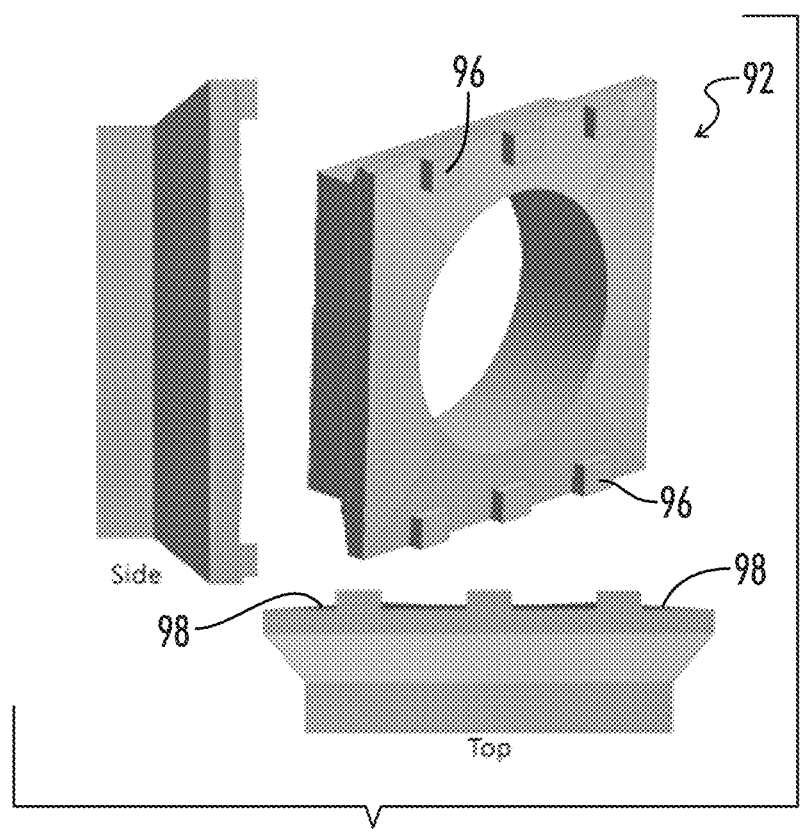
FIG. 10 is an illustration of the model block adapter of FIG. 9.
Figure 11:
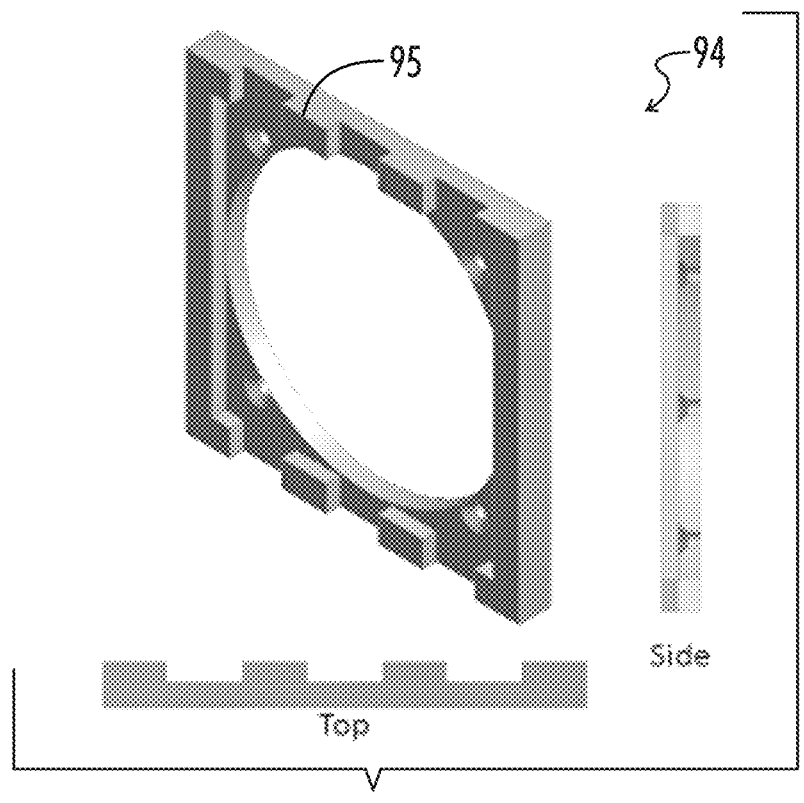
FIG. 11 is an illustration of the sting block adapter of FIG. 9.

Referring now to FIG. 10, an illustration of the model block adapter 92 of FIG. 9 the present invention is shown. The model block adapter 92 has a series of projections 96 with inclined surfaces 98 between them. As shown in FIG. 11, the sting or balance cage adapter 94 has a corresponding set of projections 95 that interact with the projections 96 and inclined surfaces 98 on the model block adapter 92 to limit movement of the model block adapter 92 with respect to the sting mount adapter 94.

Figure 12:
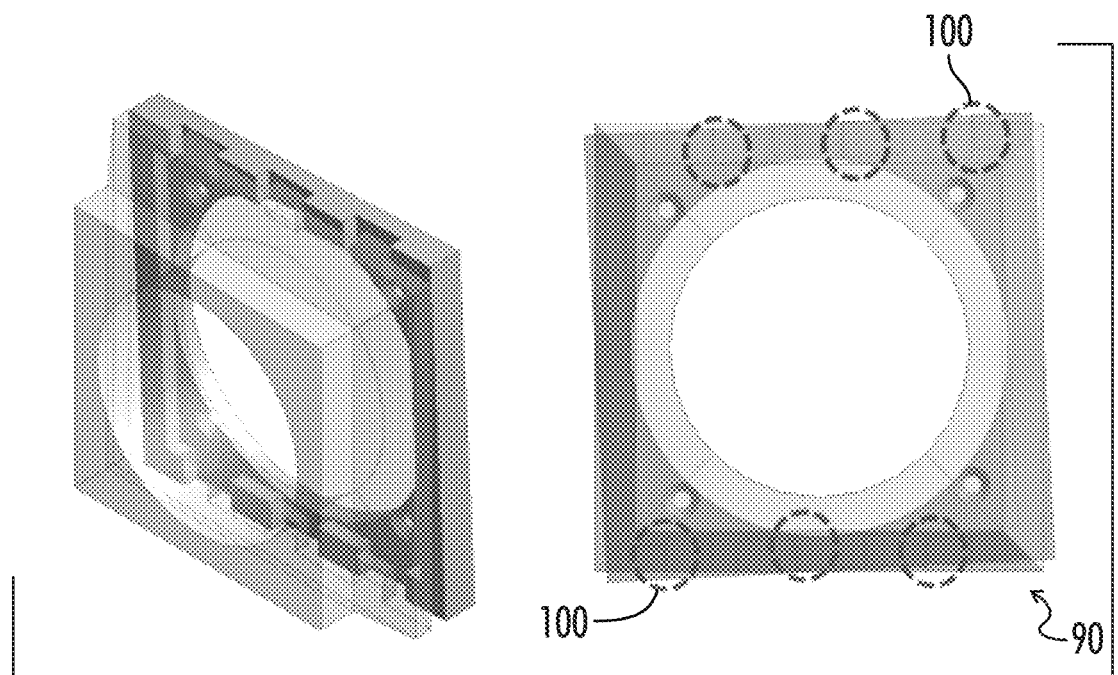
FIG. 12 is an illustration of the amount of pure roll rotation allowed by the rotation limiting coupler of FIG. 9.

Referring now to FIG. 12, an illustration of the amount of pure roll rotation allowed by the rotation limiting coupler 90 of FIG. 9 is shown. The interaction of, and clearances between, the projections of the model block adapter 92 with the projections of the sting block adapter 94 allows the adapter 92 to limit roll with respect to the adapter 94 to a predetermined amount 100 as shown in the figure.

Figure 13:
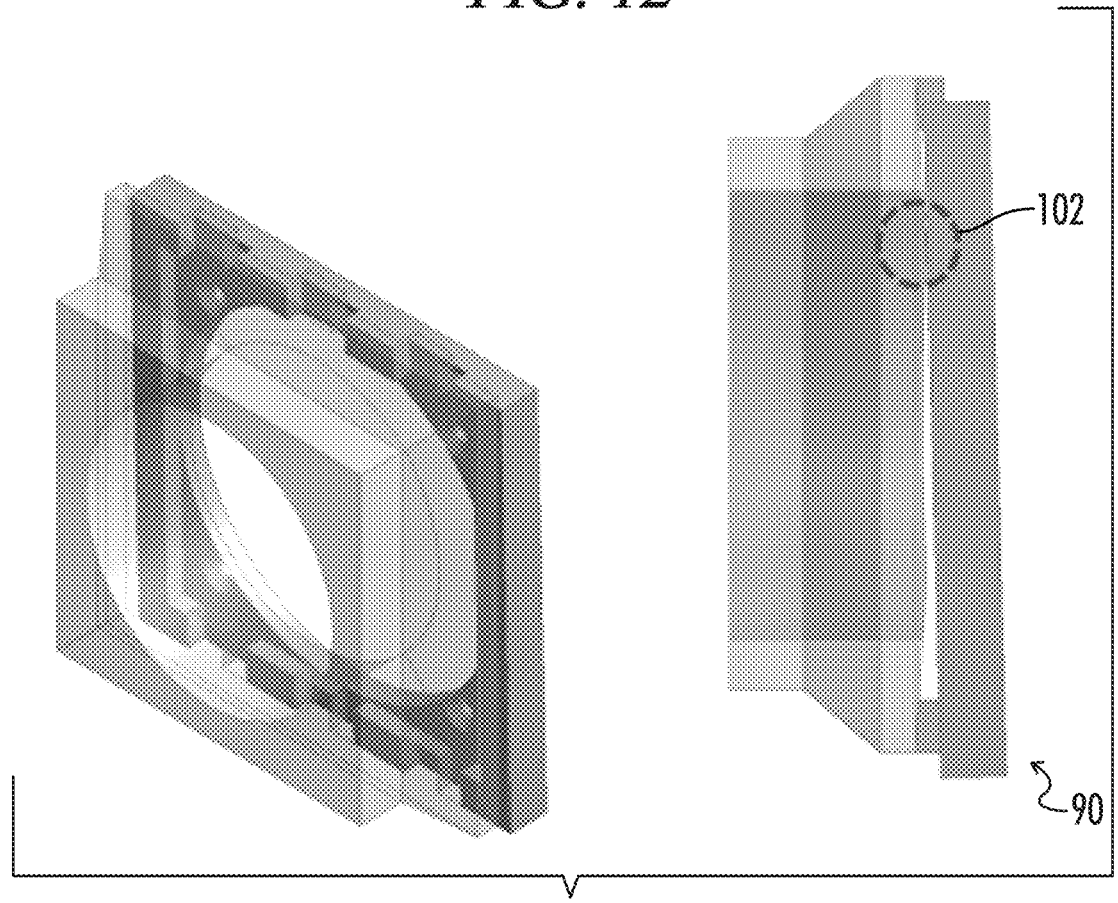
FIG. 13 is an illustration of the amount of pure pitch rotation allowed by the rotation limiting coupler of FIG. 9.

Referring now to FIG. 13, an illustration of the amount of pure pitch rotation allowed by the rotation limiting coupler 90 of FIG. 9 is shown. In a similar manner to that described above, the interaction of the projections of the model block adapter 92 with the projections of the sting block adapter 94 allows the adapter 92 to limit pitch with respect to the adapter 94 to a predetermined amount 102 as shown in the figure.

Figure 14:
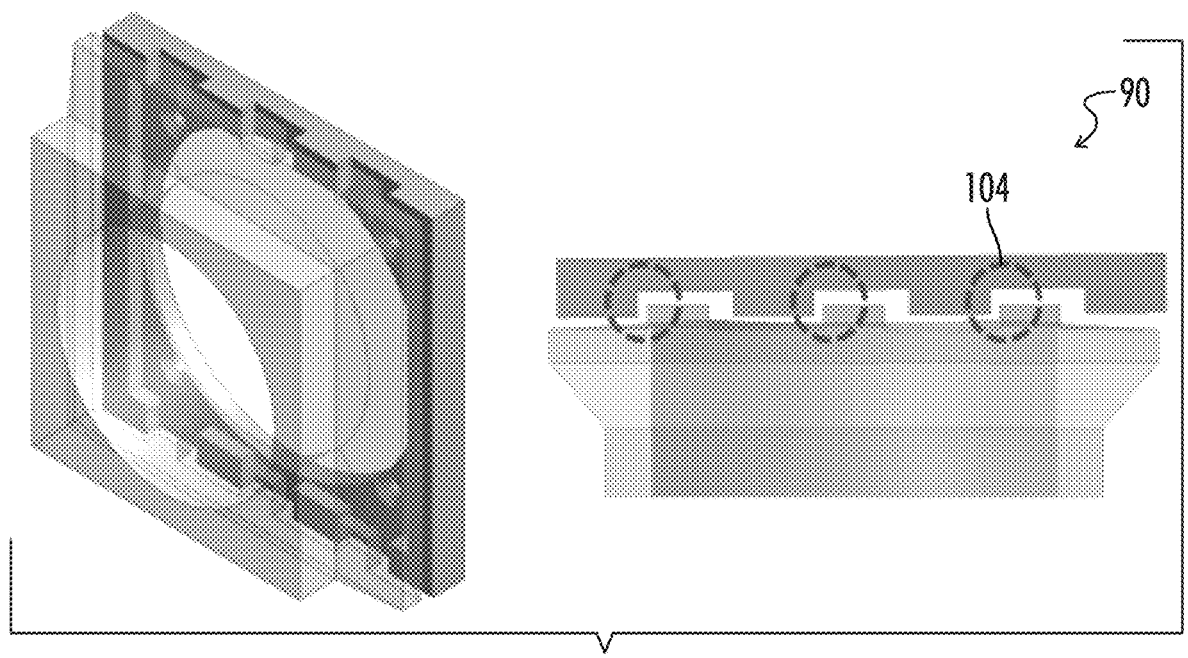
FIG. 14 is an illustration of the amount of pure yaw rotation allowed by the rotation limiting coupler of FIG. 9.

Referring now to FIG. 14, an illustration of the amount of pure yaw rotation allowed by the rotation limiting coupler 90 of FIG. 9 is shown. The interaction of the projections of the model block adapter 92 with the projections of the sting block adapter 94 also allows the adapter 92 to limit yaw with respect to the adapter 94 to a predetermined amount 104 as illustrated. Thus, by varying the incline of the interacting surfaces and the clearances between the interacting surfaces, rotational limits along three axis of rotation can be mechanically set by the embodiment of FIG. 9.

Figure 15:
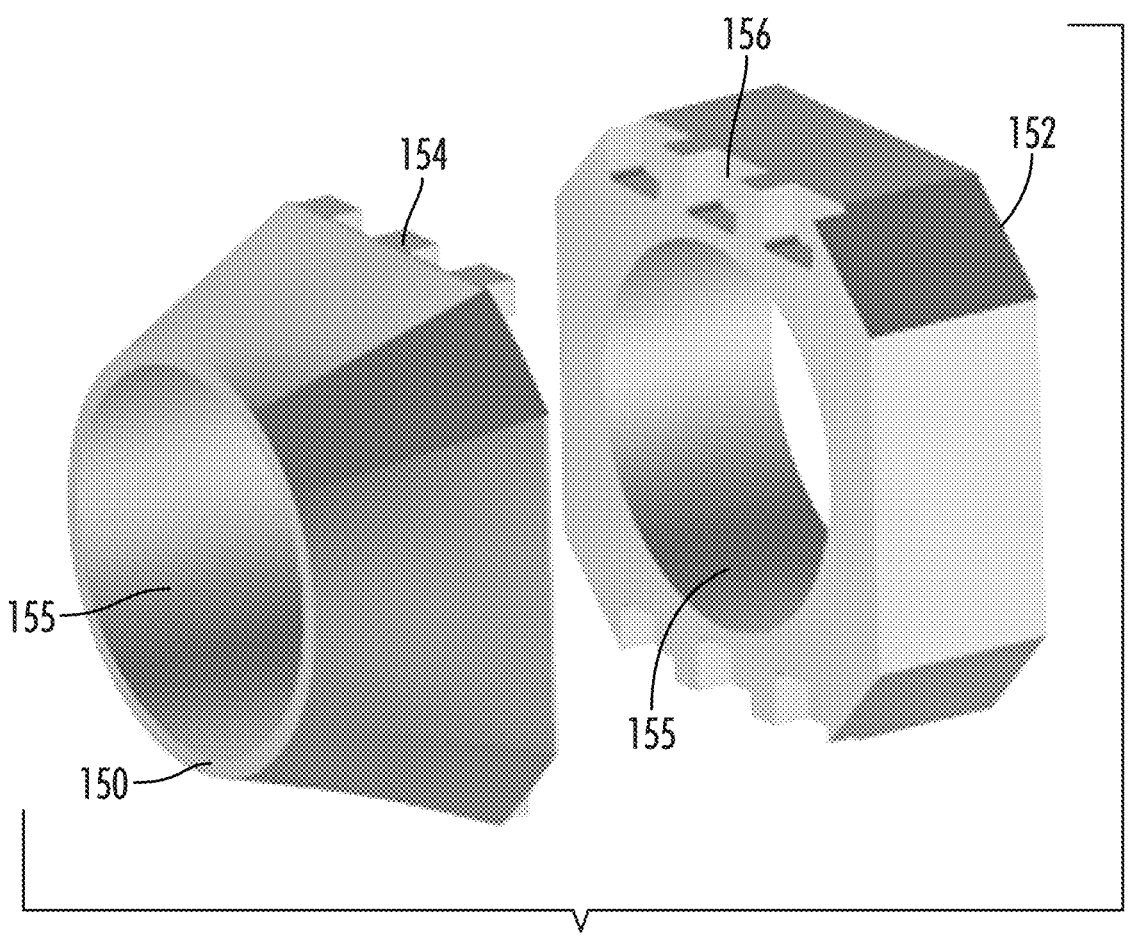
FIG. 15 is an illustration of a sting adapter and model block adapter constructed in accordance with an embodiment of the present invention.

Referring now to FIG. 15, an illustration of a sting adapter 150 and model block adapter 152 constructed in accordance with an embodiment of the present invention is shown. In an actual application, the model block adapter 152 would be incorporated into the end of the model block. The sting adapter 150 would be fitted to the sting. The teeth 154 on the sting adapter 150 interact with the corresponding cavities 156 on the model block 152 to limit rotation of the model with respect to the balance. The sting and balance pass through the central openings 155 in these two components and are solidly connected to each other. The coupling of the two blocks are designed to deliver hard stops when deflection or roll have reached pre-determined limits as discussed in more detail herein.

Figure 16:
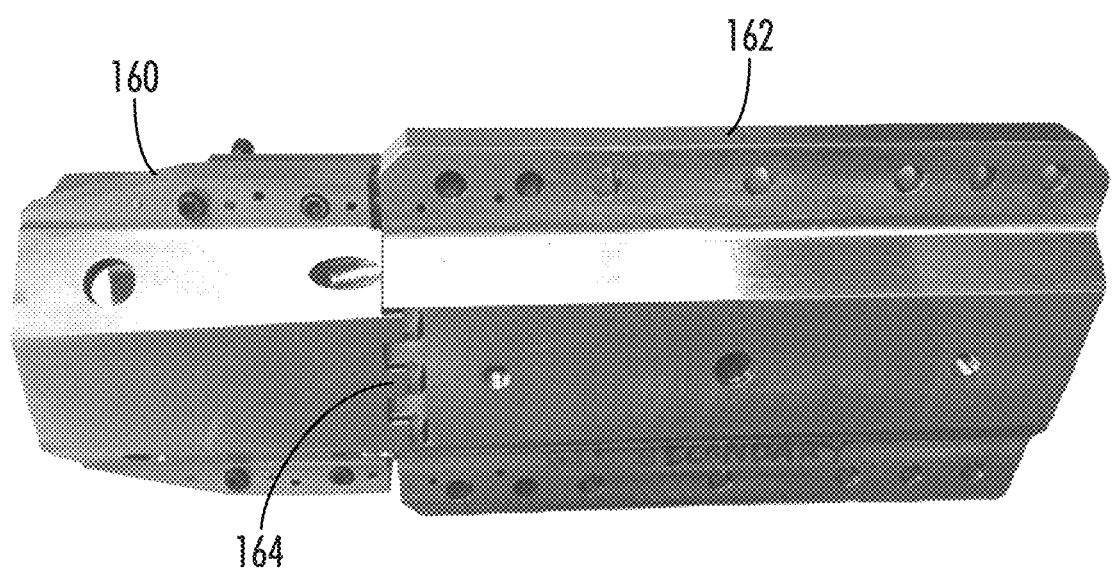
FIG. 16 is an illustration of a balance protection system that includes a sting adapter and model block adapter constructed in accordance with an embodiment of the present invention.

Referring now to FIG. 16, an illustration of a balance protection system that includes a sting adapter 162 and model block adapter 160 constructed in accordance with an embodiment of the present invention is shown. The sting adapter 162 includes a balance cage that contains the balance and the sting. The model block adapter 160 is attached to the model. The interaction of the fingers 164 of the sting 162 and model block adapters 160 function to limit motion between the model and the balance and, thus, protect the balance from damage.

Figure 17:
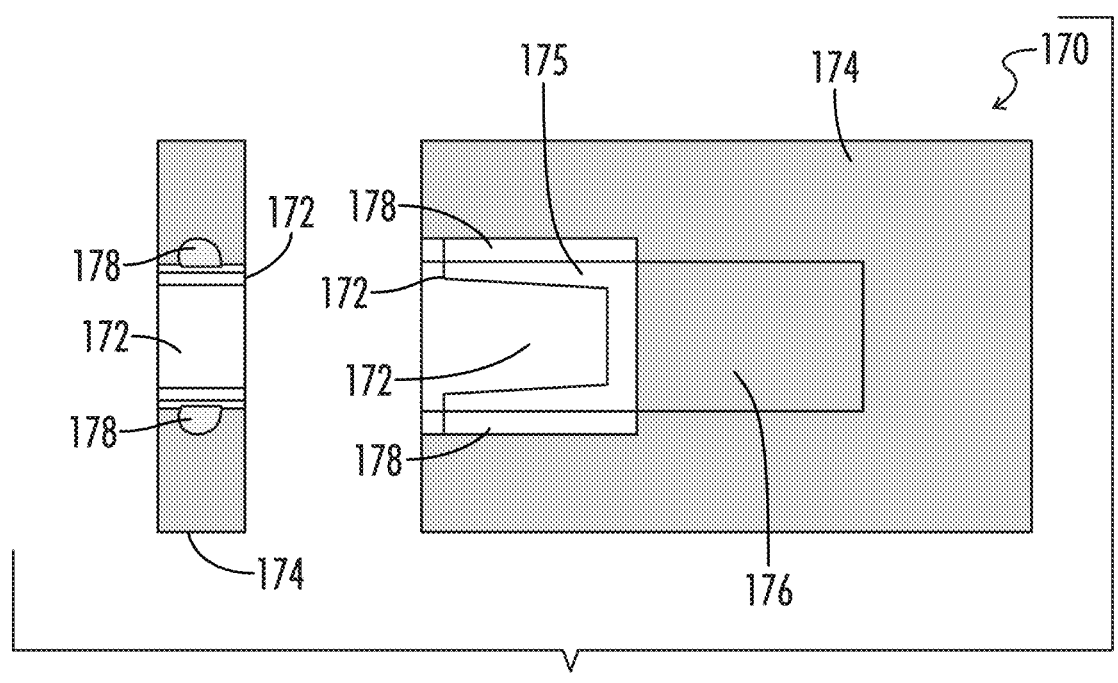
FIG. 17 is a schematic diagram of an active balance protection system constructed in accordance with an embodiment of the present invention with the damping or locking block disengaged.
Figure 18:
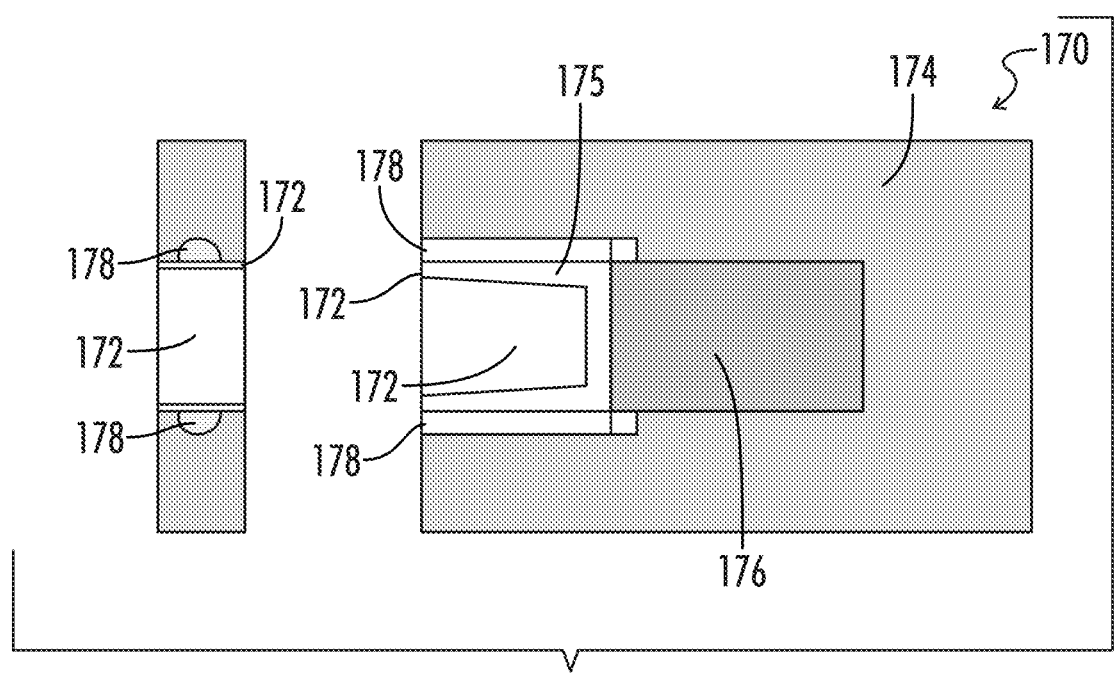
FIG. 18 is a schematic diagram of the active balance protection system of FIG. 17 with the damping or locking block engaged.

Referring now to FIG. 17, a schematic diagram of an active balance protection system 170 constructed in accordance with an embodiment of the present invention with the damping or locking block 175 disengaged is shown. The engaging projections and cavities 172 of the sting block 174 are formed on a damping block 175 that is coupled to an actuator 176. While a piezo electric transducer is used as the actuator 176 in the embodiment shown, other types of actuators can be used if desired. FIG. 18 is a schematic diagram of the active balance protection system of FIG. 17 with the damping or locking block 175 engaged. As shown in the figure, applying a signal to the piezo electric transducer 176 moves the damping block 175 with the engaging projections and cavities 172 forward thereby altering the clearances between the interacting projections and, thus, the limits imposed by the balance protection system. Block guides 178 are used to guide the movement of the damping or locking block 175.

Figure 19:
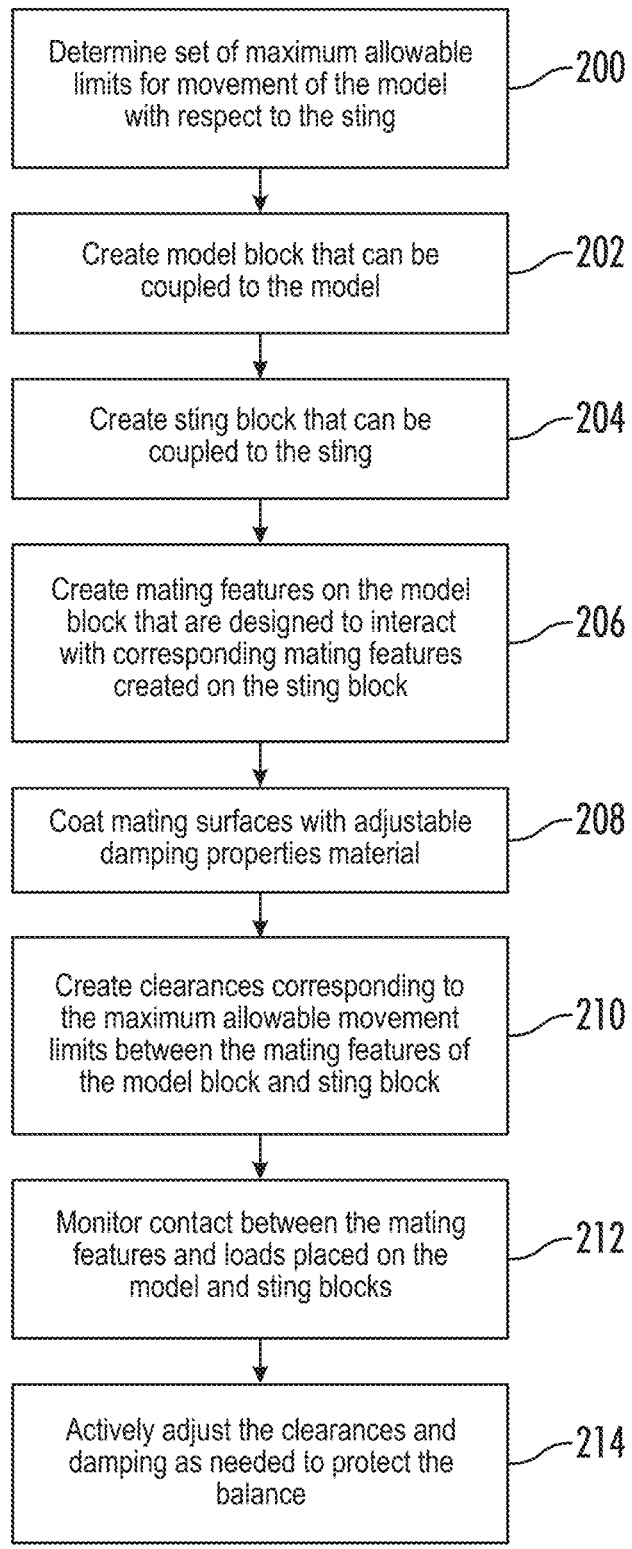
FIG. 19 is a flow chart of a method for implementing a balance protection system in accordance with an embodiment of the present invention.

Referring now to FIG. 19, a flow chart of a method for implementing a balance protection system is shown. The balance protection system is used in accordance with a model coupled to a balance which is in turn coupled to sting. The method begins in step 200 with the determining of a set of maximum allowable limits for movement of the model with respect to the sting and, thus, the forces placed upon the balance. Next, a model block is created that can be coupled to the model in step 202 and a sting block is created that can be coupled to the sting in step 204. In step 206, mating features are created on the model block that are designed to interact with corresponding mating features on the sting block. The mating features are then coated with a material with adjustable damping properties in step 208. Clearances corresponding to the maximum allowable movement limits are then created between the mating features of the model block and sting block in step 210. Contact between the mating features and loads placed on the model and sting blocks is monitored in step 212. An active system further includes the step 214 of actively adjusting the clearances and damping as needed to protect the balance as discussed in more detail herein.

The goal of this technology innovation is to provide a practical solution towards reducing the amplitudes of oscillations experienced by a balance during tests, including limiting the amplitudes of such excursions. As discussed above, the invention can be implemented using passive, adaptive and or active techniques, which are feasible designs for specific balances and models and will effectively eliminate the potential for serious damage to a balance in the model's and balance's support systems. The present invention directly increases wind tunnel productivity in a number of ways. It protects the balance (and the model) from being damaged when exposed to sudden unplanned extreme conditions. Active or adaptive systems allow the operator to manually or automatically limit a balance's displacements and rotational motions, which protects the balance in the model balance support system from being damaged. Operating a facility for numerous different types of tests is also simplified for sequential testing, without the need to stop the facility for removing the balance from the model and balance support system. These improved capabilities save time and resources by allowing for uninterrupted facility operation and system testing.

While the present invention is readily adaptable to existing stings and model blocks, stings and their models can be originally constructed to have the functionality of the BPS integrated into the sting and balance components themselves.

Although there have been described particular embodiments of the present invention of a new and useful Technology to Control a Model and Balance Support System's Dynamics and Isolate the Balance as Needed to Increase Test Facilities Productivity, it is not intended that such references be construed as limitations upon the scope of this invention except as set forth in the following claims.

What is claimed is:

1. A balance protection system for a wind tunnel test system that includes a model, a balance and a sting, said balance protection system comprising:
    a model component connected to said model;
    a sting component connected to said sting; and
    a coupler that limits movement of said model component with respect to said sting component to a predetermined amount of movement, such that a maximum amount of force applied to the balance by the model is limited, the predetermined amount of movement being greater than zero.

2. The balance protection system of claim 1 wherein said coupler further comprises a rotation limiter.

3. The balance protection system of claim 1 wherein said coupler further comprises a first set of features on said model component that mate with a second set of features on said sting component and wherein a clearance between said first set of features and said second set of features determines said predetermined amount of movement.

4. The balance protection system of claim 3 wherein at least one of said first set of features on said model component and said second set of features on said sting component further comprises a mating interface surface coated with a material that dampens interactions between said first and second sets of features.

5. The balance protection system of claim 4 wherein said material has variable damping properties which can be remotely controlled.

6. The balance protection system of claim 3 wherein said first and said second set of features are removable and replaceable.

7. The balance protection system of claim 3 further comprising an actuator that allows an amount of said clearance to be at least one of actively adjusted, detected and measured.

8. The balance protection system of claim 7 wherein said actuator further comprises a piezo electric transducer.

9. The balance protection system of claim 7 wherein said actuator further comprises an electromechanical actuator.

10. The balance protection system of claim 7 wherein said actuator further comprises an electrorheological actuator.

11. The balance protection system of claim 3 wherein said first set of features comprises a set of mechanical teeth and said second set of features comprises a second set of mechanical teeth that interact with said first set of mechanical teeth to limit movement of said model component with respect to said balance to said predetermined amount of movement.

12. The balance protection system of claim 3 wherein said first and second set of features further comprises at least one convex shaped projection that interacts with at least one concave shaped projection to limit said movement of said model with respect to said balance to said predetermined amount of movement.

13. The balance protect on system of claim 1 further comprising application software for a data acquisition system computer that monitors and controls said balance protection system.

14. The balance protection system of claim 1 further comprising a detector that detects when said coupler is limiting movement of said model component with respect to said sting component.

15. The balance protection system of claim 1 further comprising an actuator that allows a user to selectively arrest relative motion between the model and sting components.

16. A method of implementing a balance protection system for a test system comprising a model, a balance and a sting connected to said balance, said method comprising the steps of:

determining a set of maximum allowable limits for movement of said model with respect to said sting, at least one or more of the set of maximum allowable limits being greater than zero;
creating a model block that can be coupled to said model;
creating a sting block that can be coupled to said sting;
creating mating features on said model block that are designed to interact with corresponding mating features created on said sting block; and
creating clearances corresponding to said maximum allowable movement limits between said mating features of said model block and said mating features of said sting block.

17. The method of claim 16 further comprising the step of actively adjusting said clearances.

18. The method of claim 16 further comprising the step of coating a mating surface on at least one of said mating features of said model block and said mating features on said sting block with a material that dampens interactions between said features.

19. The method of claim 16 further comprising the step of detecting when said balance protection system is limiting movement of said model with respect to said sting.

20. The method of claim 16 further comprising the step of using application software to monitor and control said balance protection system.

21. The method of claim 19 further comprising integrating the detection with balance data.

* * * * *